United States Patent
Davydov et al.

(10) Patent No.: US 11,985,011 B2
(45) Date of Patent: May 14, 2024

(54) DISTRIBUTED MINIMUM MEAN-SQUARE ERROR INTERFERENCE REJECTION COMBINING (MMSE-IRC) PROCESSING FOR RADIO ACCESS NETWORKS

(71) Applicant: Intel Corporation, Santa Clara, CA (US)

(72) Inventors: Alexei Davydov, Nizhny Novgorod NIZ (RU); Victor Sergeev, Nizhny Novgorod NIZ (RU); Bishwarup Mondal, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 17/130,940

(22) Filed: Dec. 22, 2020

(65) Prior Publication Data

US 2021/0111930 A1 Apr. 15, 2021

Related U.S. Application Data

(60) Provisional application No. 63/049,033, filed on Jul. 7, 2020.

(51) Int. Cl.
*H04L 25/03* (2006.01)
*H04B 1/12* (2006.01)
(Continued)

(52) U.S. Cl.
CPC ......... *H04L 25/03006* (2013.01); *H04B 1/12* (2013.01); *H04B 17/345* (2015.01);
(Continued)

(58) Field of Classification Search
CPC ............ H04L 25/03006; H04L 5/0048; H04L 25/0258; H04L 2025/03624; H04B 17/345; H04B 1/12; H04W 72/541; H04J 11/005
See application file for complete search history.

(56) References Cited

U.S. PATENT DOCUMENTS

2018/0159611 A1* 6/2018 Majmundar ............ H04L 47/38
2022/0021423 A1* 1/2022 Ahmed ................ H04B 7/0617

FOREIGN PATENT DOCUMENTS

WO WO-2020130895 A1 * 6/2020 ............... H04B 1/40

OTHER PUBLICATIONS

3GPP TR 21.905 V16.0.0 (Jun. 2019), "3rd Generation Partnership Project; Technical Specification Group Services and System Aspects; Vocabulary for 3GPP Specifications (Release 16)," 66 pages.
(Continued)

*Primary Examiner* — Freshteh N Aghdam
(74) *Attorney, Agent, or Firm* — Schwabe, Williamson & Wyatt, P.C.

(57) ABSTRACT

Various embodiments herein provide techniques for minimum mean-square error interference rejection combining (MMSE-IRC) processing of a received signal, distributed between a baseband unit (BBU) and a remote radio unit (RRU). The RRU may perform a first phase of processing based on an extended channel that includes a channel of one or more user equipments (UEs) served by the RRU and interference samples that correspond to other cells or additive noise. The first phase may include scaling the interference samples by a scaling coefficient to obtain a modified extended channel, and performing maximum ratio combining (MRC) on the modified extended channel to obtain a processed signal. The RRU may send the processed signal to the BBU for the second phase of processing. The second phase of processing may include regularized zero forcing to remove interference. Other embodiments may be described and claimed.

28 Claims, 8 Drawing Sheets

(51) Int. Cl.
*H04B 17/345* (2015.01)
*H04J 11/00* (2006.01)
*H04L 5/00* (2006.01)
*H04L 25/02* (2006.01)
*H04W 72/541* (2023.01)

(52) U.S. Cl.
CPC .......... *H04J 11/005* (2013.01); *H04L 5/0048* (2013.01); *H04L 25/0258* (2013.01); *H04W 72/541* (2023.01); *H04L 2025/03624* (2013.01)

(56) References Cited

OTHER PUBLICATIONS

Huang et al., "Fronthaul Functional Split of IRC-based Beamforming for Massive MIMO Systems," 978-1-7281-1220-6/19/ IEEE, Ericsson Research, Stockholm, Sweden; 5 pages. [Downloaded on Dec. 4, 2020 at 20:15:30 UTC from IEEE Xplore.].

\* cited by examiner

DISTRIBUTED MINIMUM MEAN-SQUARE ERROR INTERFERENCE REJECTION COMBINING (MMSE-IRC) PROCESSING FOR RADIO ACCESS NETWORKS

CROSS REFERENCE TO RELATED APPLICATION

The present application claims priority to U.S. Provisional Patent Application No. 63/049,033, which was filed Jul. 7, 2020, the disclosure of which is hereby incorporated by reference.

FIELD

Various embodiments generally may relate to the field of wireless communications.

BACKGROUND

Massive multiple input multiple output (MIMO) is considered as one of the promising technologies for fifth generation (5G) cellular networks. The use of large number of the antennas with digital transceiver units (TXRUs) at the base station (BS) greatly improves the capacity of the network through use of the advanced beamforming techniques effectively mitigating both inter- and intra-cell interferences.

In massive MIMO aided cloud radio access network (C-RAN), a set of remote radio units (RRUs) with large number of antennas are deployed in a certain geographical area and connected to a centralized baseband unit (BBU) through a high bandwidth and low-latency fronthaul (FH) link. Such C-RAN architecture facilitates different options of the functional split in the radio network, e.g., to achieve optimal tradeoff between BBU and RRU processing.

One major performance bottleneck for the uplink reception in massive MIMO aided C-RAN is capacity of FH link. As the number of TXRUs and antennas at RRU are increased to obtain the massive MIMO gains, the amount of data traffic that needs to be transferred trough FH link also increases proportionally.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for distributed minimum mean-square error interference rejection combining (MMSE-IRC) processing of a received signal. The processing may be distributed between a baseband unit (BBU) and a remote radio unit (RRU) of a wireless cellular radio access network (RAN), such as a cloud RAN (C-RAN). In some embodiments, the received signal may include an uplink signal transmitted by one or more user equipments (UEs).

Figure 1:
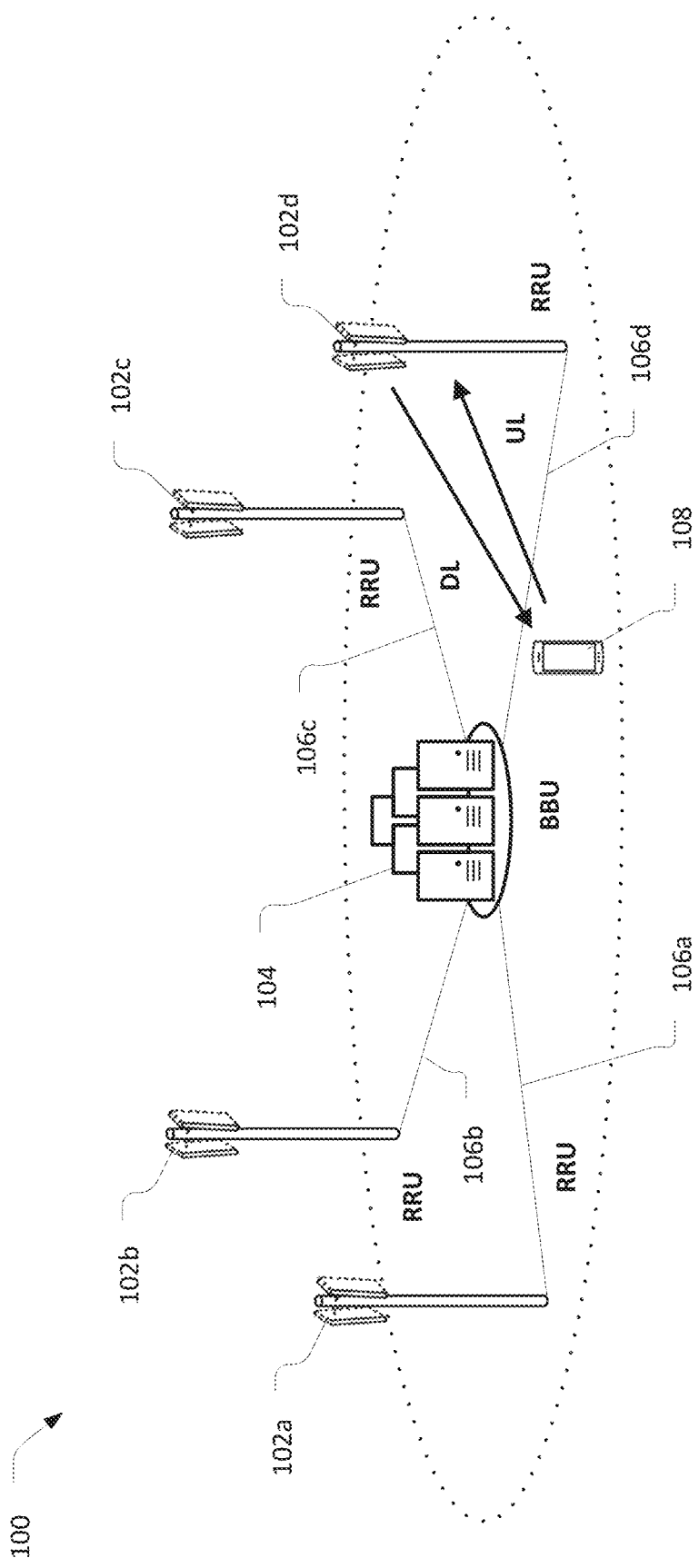
FIG. 1 illustrates a network environment in accordance with various embodiments.

FIG. 1 illustrates a network environment 100 for a RAN, in accordance with various embodiments. In some embodiments, the RAN may be a C-RAN. The network environment 100 may include a plurality of remote radio units (RRUs) 102a-d communicatively coupled to a baseband unit (BBU) 104 via a fronthaul (FH) link 106a-d. The RRUs 102a-d may communicate with one or more user equipments (UEs), such as UE 108, via a set of antennas with digital transceiver units (TXRUs). The network environment 100 may be used for massive multiple input, multiple output (MIMO) communication.

In various embodiments, the RRU 102a-d may perform a first phase of processing using an extended channel for receive (Rx) beamforming that includes Rx beamforming vectors derived from a channel of one or more UEs served by the RRU and interference samples that correspond to other cells or additive noise. The channel of the one or more UEs may correspond to a serving cell of the one or more UEs, and may be associated with specific network resources (e.g., time, frequency, and/or spatial resources). The first phase may include receive (Rx) beamforming, e.g., using maximum ratio combining (MRC). In some embodiments, the first phase may include scaling the interference samples by a scaling coefficient to obtain a modified extended channel, and performing MRC on the modified extended channel to obtain a processed received signal. The first phase of processing may compress the N received signals to L processed signals using receive (Rx) beamforming derived based on the extended channel. The receive beamforming may be defined by a matrix of N by L, wherein L is less than N. The number N may correspond to a number of TXRUs in the antenna panel of the RRU 102a-d. The RRU 102a-d may send the processed signals after beamforming to the BBU 104 for a second phase of processing.

In various embodiments, the BBU 104 may perform the second phase of processing on the processed signals received from the RRU 102*a-d*. The second phase of processing may include a regularized zero forcing operation to remove interference. In embodiments, the first and second phases of processing may combine to remodel MMSE-IRC processing of the uplink signal received from the one or more UEs, e.g., to mitigate intra-cell and/or inter-cell interference. The remodeled MMSE-IRC processing may be based on a linear combination of a sample covariance matrix and a structured covariance matrix that corresponds to interference from other cells or additive noise. This technique may reduce the mean square error (MSE) of interference covariance matrix estimation, thereby improving the performance of the processing compared with prior techniques.

Additionally, in embodiments, the processed signals may be quantized (e.g., converted to digital values) by the RRU 102*a-d* before transmission to the BBU 104. The scaling used on receive beamforming corresponding to the interference samples may reduce the dynamic range of the values in the processed signals generated by the first phase of processing. Accordingly, the number of bits used to quantize the processed signals for transmission to the BBU may be reduced, thereby reducing the bandwidth of the fronthaul link that is used to transmit the processed channel from the RRU 102*a-d* to the BBU 104. Additionally, the reduced size of the quantized signals and/or the offloading of the first phase of processing to the RRU 102*a-d* may reduce the processing load required of the BBU 104.

In some embodiments, the value of the scaling coefficient may be predetermined, e.g., based on an implementation of the RAN, a complexity of the BBU 104, considerations of efficiency compared with performance, and/or other criteria. In other embodiments, the value of the scaling coefficient may be dynamically determined, e.g., based on a processing load of the BBU 104 (e.g., in conjunction with a processing capability of the BBU 104). For example, the scaling coefficient may be a value from 0 to 1, with the 0 value providing no scaling to the interference samples and the 1 value reducing the interference samples to 0. When the scaling coefficient is 1 and the interference samples are reduced to 0, some elements of the processed signal may be 0. Accordingly, the RRU 102*a-d* may not transmit these elements to the BBU 104, thereby reducing the size of the processed signal transmitted over the fronthaul link 106*a-d*.

Additionally, or alternatively, embodiments herein may enable separating processing operations into operations that include the measurements of the channel (and may or may not include the measurements of interference samples) and operations that include the measurements of interference samples but do not include the channel. In some embodiments, the RRU 102*a-d* and/or BBU 104 may perform their respective phases of processing using a different granularity for measurements of the channel than for measurements of the interference samples. For example, the processing operations that include the channel may be performed with a smaller/finer granularity in time and/or frequency than operations that include the interference samples. Accordingly, the processing operations may be performed more often and/or with smaller frequency ranges. Since the interference samples may not change as much over time and/or frequency as the channel measurements, these techniques may reduce processing power/complexity without significantly affecting performance.

Prior techniques have used split processing between the RRU and BBU to perform MMSE-IRC based on unstructured interference covariance matrix estimation. However, for an N-antenna system with M layers and L total number of FH streams (L<N), the number of interferer samples for interference and noise covariance matrix estimation supported by the prior scheme is K=L−M, which is less the number of antenna elements N used at RRU. Under such condition, e.g., K<N, the unstructured sample covariance matrix in MMSE-IRC is not a maximum likelihood solution and has high MSE. As the result, due to inaccurate interference and noise covariance estimation, the overall performance of the MMSE-IRC receiver may degrade significantly.

In contrast, the techniques described herein provide MMSE-IRC processing based on the linear combination of the sample covariance and structured covariance matricies. At the expense of the increased bias, this approach reduces MSE of interference covariance matrix estimation and provides interference-mitigation capability while maintaining robust uplink performance. In this regard, the techniques described herein may greatly improve the performance under limited number of interference vector samples.

Figure 3:
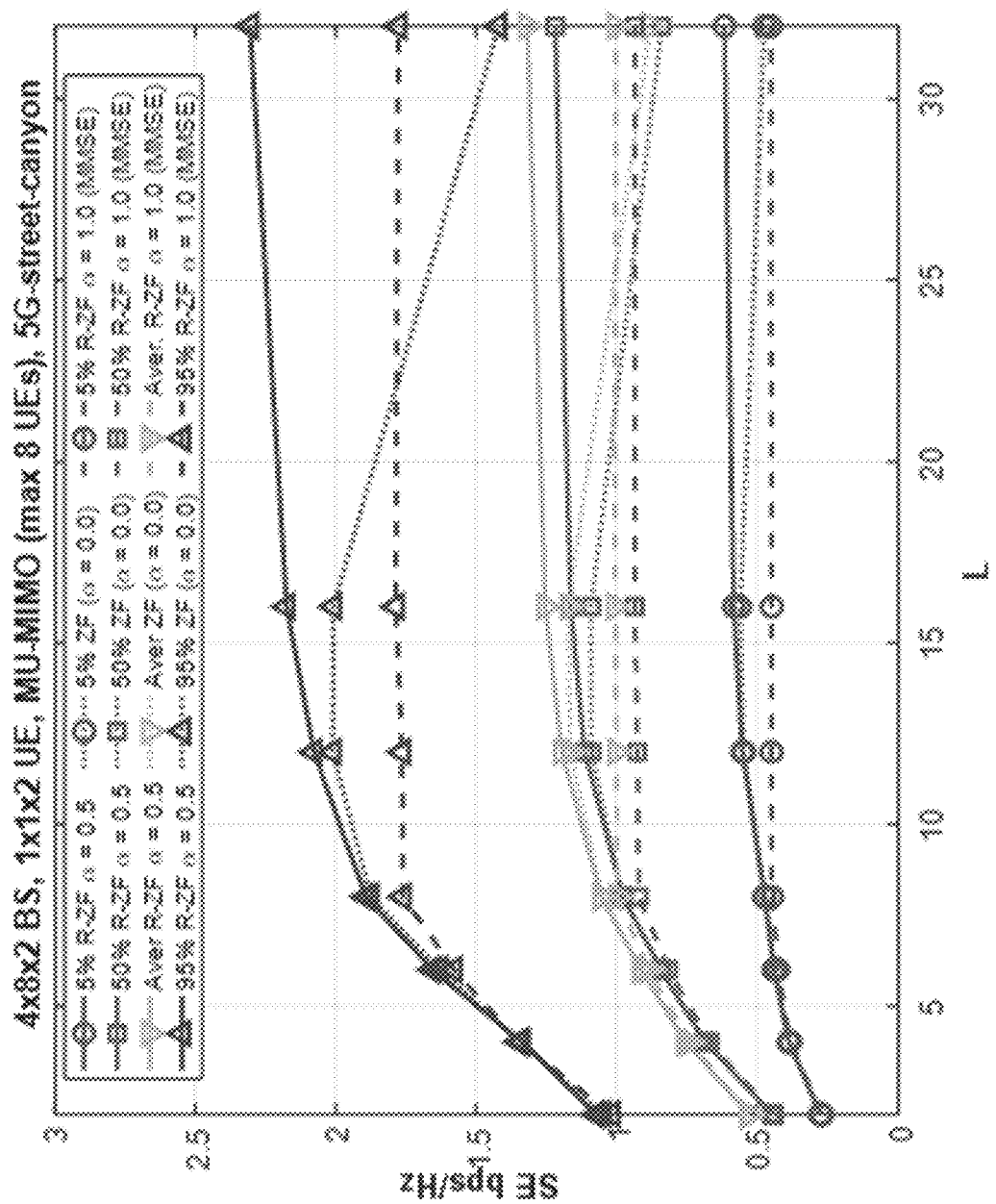
FIG. 3 illustrates simulation results in accordance with various embodiments.

Simulation results are shown in FIG. 3 and discussed further below. The simulation results show that the techniques described herein improve the uplink performance compared to prior techniques for MMSE-IRC based on the sample interference covariance matrix estimation.

Figure 2:
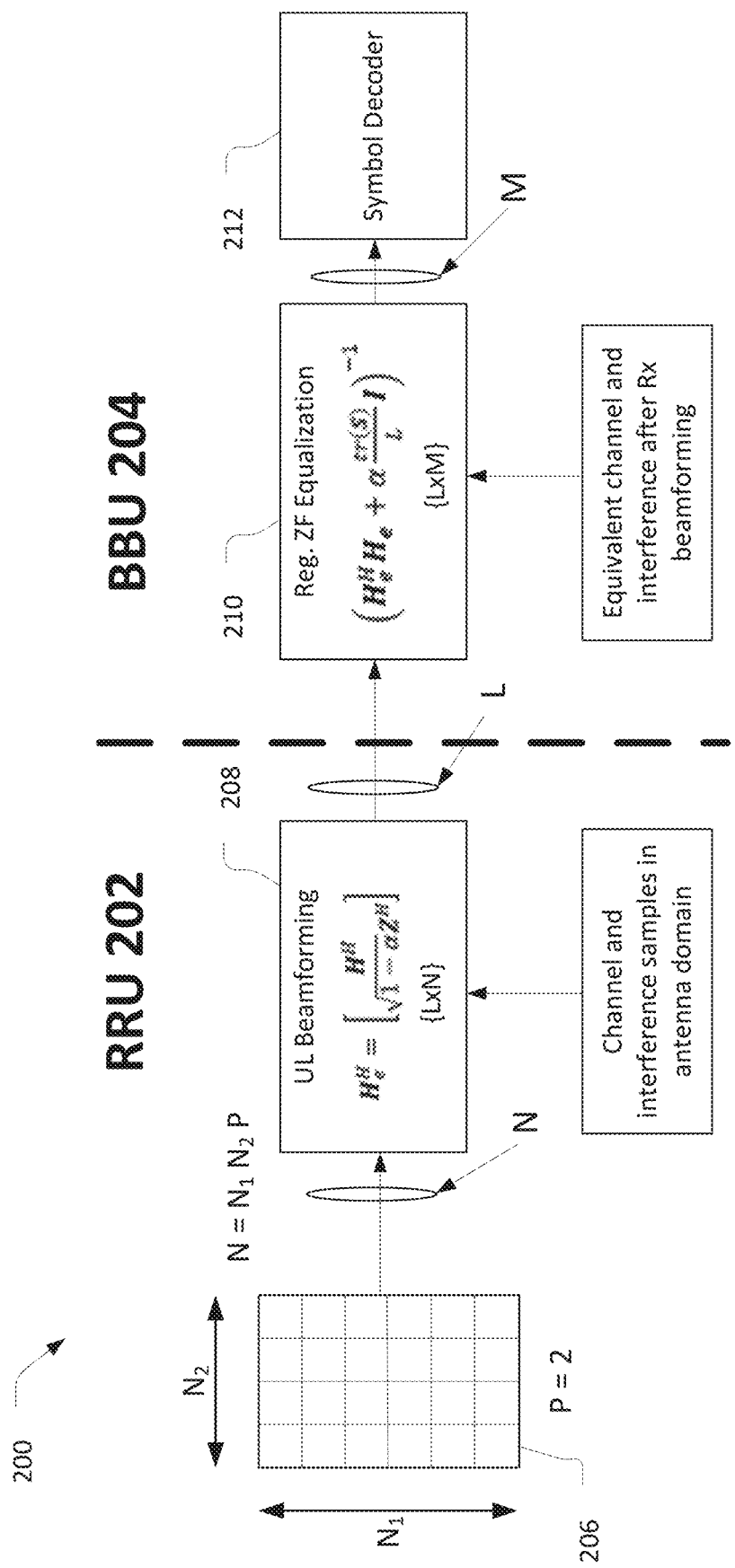
FIG. 2 illustrates distributed minimum mean-square error interference rejection combining (MMSE-IRC) processing, in accordance with various embodiments.

FIG. 2 illustrates a distributed MMSE-IRC process 200 in accordance with various embodiments. The process 200 may be distributed between an RRU 202 and a BBU 204. The RRU 202 may include an antenna array 206 with N elements to receive M data layers from UEs served by the RRU 202. The N elements may correspond to the number of TXRUs (e.g., N1×N2 for a rectangular antenna array) multiplied by a number of polarizations of the TXRUs (e.g., 2 polarizations, such as vertical and horizontal).

In embodiments, the RRU 202 may receive an extended channel to perform a first phase of processing. The extended channel may include a channel of the served UEs and interference samples that correspond to other cells or additive noise. The RRU 202 may perform a first phase 208 of processing based on the extended channel. The first phase 208 may include receive beamforming, e.g., using MRC. For example, in some embodiments, the first phase 208 may be performed according to:

$$H_e^H = \begin{bmatrix} H^H \\ \sqrt{1-\alpha} Z^H \end{bmatrix} \quad (1)$$

wherein $H_e$ is the modified extended channel; H is the channel; $H_e^H$, $H^H$, and $Z^H$ denote a Hermitian Transpose of $H_e$, H, and Z, respectively, α is the scaling coefficient; and Z is an interference sample matrix that corresponds to the interference samples. The first phase 208 may be performed using L×N beamforming matrix to generate a processed signal with L elements from the received signal with N elements on a given sub carrier.

The RRU 202 may send the processed signal generated by the first phase 208 to the BBU 204. The BBU 204 may perform a second phase 210 of the MMSE-IRC processing on the processed signal received from the RRU 202. In some embodiments, the second phase 210 may include regularized zero forcing (ZF) equalization. For example, the second phase 210 may be performed according to:

$$\left(H_e^H H_e + \alpha \frac{tr(S)}{L} I\right)^{-1} \quad (2)$$

wherein $H_e^H$ is the processed signal, $H_e$ is the channel of the one or more UEs, $\alpha$ is the scaling coefficient, tr(•) is a trace function, S is a sample covariance matrix, L is the number of elements in the received processed signal, and I is an identity matrix. The second phase 210 may generate an output signal with M layers that correspond to the data layers of the served UEs. The BBU 204 may provide the output signal to a symbol decoder 212 (which may be included in the BBU 204) to decode the data in the M layers of the output signal.

Various aspects of the process 200 will be described in further detail below.

In embodiments, an approach for interference and noise covariance matrix estimation that reduces MSE relies on a linear combination of the sample covariance matrix estimation and structured covariance matrix estimation, e.g., $$R = (1 - \alpha)S + \alpha \frac{tr(S)}{N} I_N, \quad (3)$$

where S is a sample covariance matrix defined in Equation (4) below, $I_N$ is identity matrix of dimension N, and tr(•) is a trace function.

$$S = \frac{1}{L-M} \sum_{k=1}^{L-M} z_k \cdot z_k^H. \quad (4)$$

The estimation in Equation (3) is determined by the scaling coefficient $\alpha$ defined in the range between 0 and 1. The optimal value of $\alpha$ minimizing MSE may depend on the unknown covariance matrix, the length N and number of interference sample vectors K=L−M and may be optimized for the considered scenario.

In embodiments, a modified extended channel $H_e$ may be generated, which includes a scaled version of the interfering and noise sample matrix Z according to:

$$H_e = [H \sqrt{1-\alpha} Z] \quad (5)$$

In embodiments, the MMSE-IRC with structured covariance matrix given by Equation (3) may be represented as regularized ZF (R-ZF):

$$W_{MMSE} = \Lambda_{1:M} H_e^H \left(H_e H_e^H + \alpha \frac{tr(S)}{N} I_N\right)^{-1}. \quad (6)$$

where $\Lambda_{1:m}$ is M×L row selection matrix derived from L×L identity matrix by taking the first M rows.

To facilitate distributed RRU/BBU processing, equation (6) may be defined in another form, e.g., $$W_{MMSE} = \Lambda_{1:M} \underbrace{\left(H_e^H H_e + \alpha \frac{tr(S)}{N} I_N\right)^{-1}}_{BBU} \underbrace{H_e^H}_{RRU}. \quad (7)$$

In this way, the received signal r at the RRU is first multiplied with the Hermitian transpose of the extended channel $H_e^H$ in RRU, which may correspond to applying MRC operation. The additional scaling $\sqrt{1-\alpha}$ on interference branches of MRC reduces the dynamic range of the signal after Rx beamforming, which may be exploited to also reduce FH load by using smaller number of quantization bits. After MRC, the received signal becomes compressed to L elements compared to N elements in the originally received signal r. Then the RRU sends the compressed signal via the FH link to the BBU, where the received signal is further processed with interference rejection function using regularized inversions. Thus, the whole process implementing robust MMSE-IRC based on the structured covariance matrix may be accomplished in two phases at the RRU and BBU respectively as illustrated in FIG. 2.

It should be noted that the MMSE-IRC processing in equation (7) for $\alpha=0$ becomes equivalent to IRC processing without scaling the interference samples. Additionally, for $\alpha=1$, the MMSE-IRC is reduced to MMSE without IRC requiring only M branches to be sent from the RRU to the BBU instead of L branches. Accordingly, in some embodiments, the value of the scaling coefficient may be adaptively changed to control the FH traffic and BBU processing loads. For example, in some embodiments, the BBU may send a message to the RRU to indicate a requested value of the scaling coefficient. The requested value may be determined, for example, based on a processing load and/or a processing capability of the BBU.

To apply regularized inversion in the BBU, $H_e^H$, $H_e$ and tr(S) are to be calculated. In embodiments, the RRU may provide information on $H_e$ to the BBU (e.g., via the FH link) to indicate the Rx beamforming coefficients used in the RRU. Alternatively, the BBU may calculate one or more of the values based on the processed received signal, e.g., to avoid having to send additional information via the FH link. An example technique for the BBU to perform the regularized inversion without assistance information from the RRU is described further below.

The effective channel and interference samples at the BBU after MRC beamforming may be defined as follows:

$$H_{eff} = \begin{bmatrix} H^H H \\ \sqrt{1-\alpha} Z^H H \end{bmatrix}, Z_{eff} = \begin{bmatrix} H^H Z \\ \sqrt{1-\alpha} Z^H Z \end{bmatrix} \quad (8)$$

The inner product $H_e^H H_e$ of the extended channel defined by, $$H_e^H H_e = \begin{bmatrix} H^H H & \sqrt{1-\alpha} H^H Z \\ \sqrt{1-\alpha} Z^H H & (1-\alpha) Z^H Z \end{bmatrix}, \quad (9)$$

may be represented in a form that depends on $H_{eff}$ and $Z_{eff}$ that can be estimated at BBU, such as:

$$H_e^H H_e = [H_{eff} \sqrt{1-\alpha} Z_{eff}]. \quad (10)$$

Given that Rx beamforming at RRU for the last L−M branches are determined based on interference vector samples, the regularization term in the inversion of equation (7) can be also obtained from $Z_{eff}$ as follows:

$$\alpha \frac{tr(S)}{N} = \alpha \frac{tr(\Lambda_{M+1:L} Z_{\mathit{eff}})}{N\sqrt{1-\alpha}}, \qquad (11)$$

where $A_{M+1:L}$ is L−M×L row selection matrix derived from L×L identity matrix by taking the last L−M rows.

Note that in equation (7), only a subset of the rows corresponding to the M useful signals are required. In this way, the matrix inversion at the BBU may be simplified by using the block matrix inversion property. For example, given the matrix inversion in equation (7) at BBU:

$$\Lambda_{1:M} \begin{bmatrix} H^H H + \alpha \frac{tr(\hat{S})}{N} I_M & \sqrt{1-\alpha}\, H^H Z \\ \sqrt{1-\alpha}\, Z^H H & (1-\alpha) Z^H Z + \alpha \frac{tr(\hat{S})}{N} I_{L-M} \end{bmatrix}^{-1} \qquad (12)$$

the resulting matrix inverse for the first M rows may be obtained as follows:

$$\Lambda_{1:M} \begin{bmatrix} A & B \\ C & D \end{bmatrix}^{-1} = [(A - BD^{-1}C)^{-1} \quad -(A - BD^{-1}C)^{-1} BD^{-1}] \qquad (13)$$

where the block $(A - BD^{-1}C)^{-1}$ can be calculated as:

$$\{A - BD^{-1}C\}^{-1} = \qquad (14)$$
$$\left\{ \alpha \frac{tr(S)}{L} I_M + H^H \left( I_{L-M} - Z \left( Z^H Z + \frac{\alpha}{(1-\alpha)} \frac{tr(S)}{L} \right)^{-1} Z^H \right) H \right\}^{-1}$$

Additionally, the expression (14) offers different granularities of the inner and outer matrix inversions, which may be used to decouple processing associated with the channel and processing associated with interference, thereby providing additional implementation flexibility. In particular, the demodulation performance is generally more sensitive to granularity of the channel estimation in time and frequency domain, compared to granularity of the interference measurements. Accordingly, L−M×L−M inner matrix inversions (which only depends on interference samples Z) may be calculated less often than M×M outer matrix inversions also involving channel estimation that may need to be updated more often. For example, in one embodiment, the inner matrix inversions may be calculated every 4 physical resource blocks (PRBs) (e.g., using measurements from all 4 PRBs), which the output matrix inversions may be calculated every 1 PRB. It will be apparent that other granularities in time and/or frequency may be used in accordance with various embodiments.

FIG. 3 illustrates the results of system-level simulations are presented in FIG. 3 for different number of Rx beamforming branches L={2, 4, 6, 8, 12, 16, 32}. For a given L, the first M branches were used for MRC compression based on the desired channels of the served UEs, while the remaining L-M branches based on interference samples. In this way, the number of used interference samples in the Rx beamforming of RRU is not fixed and dependent on the actual number of the scheduled users M.

For performance metric, user spectral efficiency (SE) (measured in bits per second per second (bps/Hz)) is provided in FIG. 3 for 5%-tile, 50%-tile and 95%-tile of cumulative distribution function (CDF) distribution in addition to average SE. It can be seen from the simulation results in FIG. 3, that the spectral efficiency of the baseline MMSE-IRC based on unstructured covariance matrix (dotted curves) has performance loss for large values of L, which may be explained by limited number of interference samples and unstructured covariance matrix used in the remodeled MMSE-IRC receiver.

When the MMSE-IRC functional split described herein is used (solid curves), the uplink performance becomes more robust for different values of L. In particular, structured covariance matrix with α=0.5 in equation (7) provides monotonic SE improvement for all considered values of L including larger values (e.g., L>12). The performance results indicate that the robust MMSE-IRC described herein retains both inter- and intra-cell capability of the receiver.

FIG. 3 also illustrates the performance of MMSE without IRC that may be supported using proposed RRU/BBU processing splitting framework with the scaling coefficient α=0. However, due to lack of extra FH branches associated with interference samples, the SE performance of such receiver saturates at L=8 (dashed curve) according to the maximum number of MIMO layers that may be scheduled in MU-MIMO per RRU.

Figure 4:
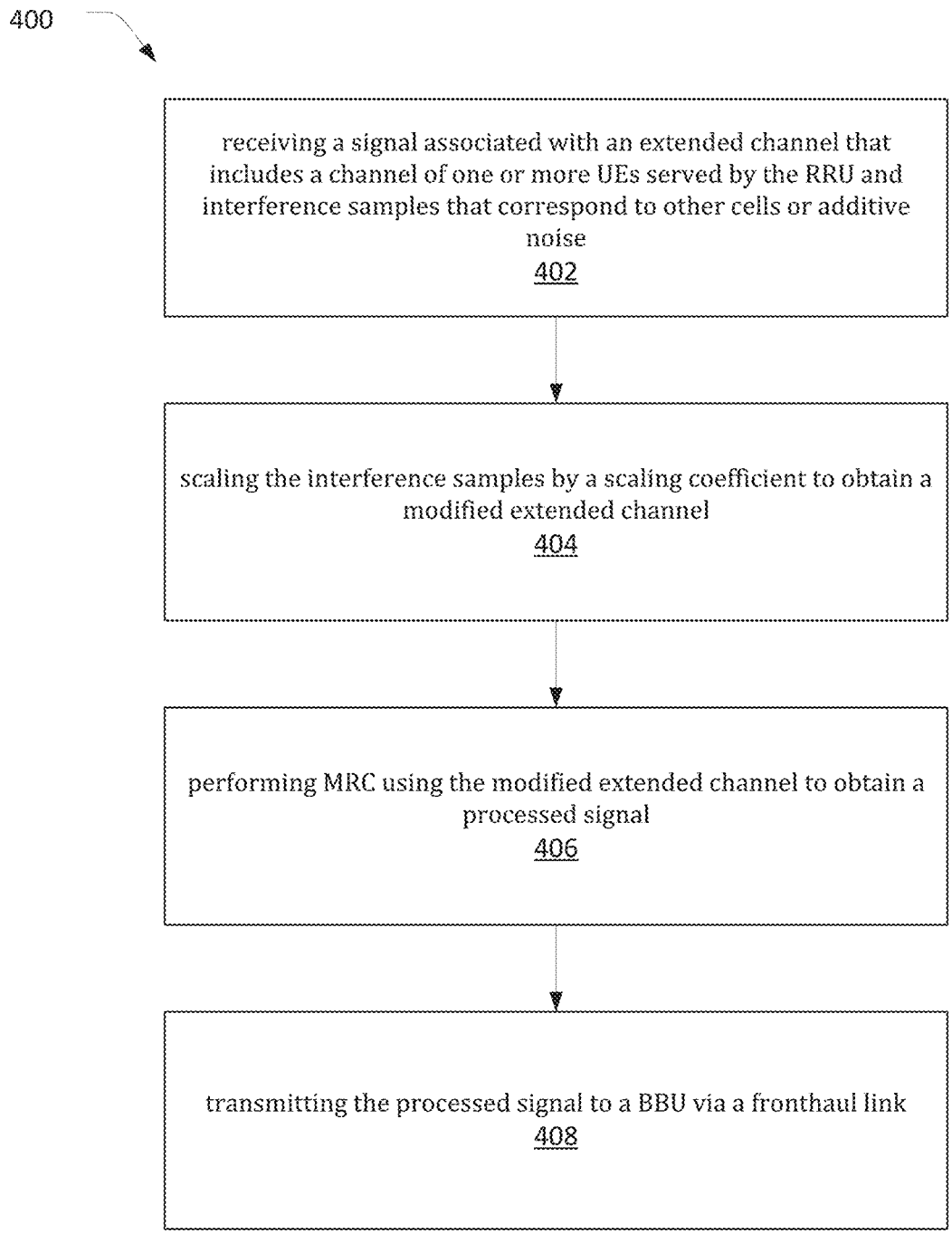
FIG. 4 illustrates a process of a remote radio unit (RRU) in accordance with various embodiments.

FIG. 4 illustrates a process 400 of a RRU in accordance with various embodiments. In some embodiments, the process 400 may be performed by baseband circuitry and/or radio frequency (RF) circuitry of the RRU.

At 402, the process 400 may include receiving a signal associated with an extended channel that includes a channel of one or more UEs served by the RRU and interference samples that correspond to other cells or additive noise. At 404, the process 400 may further include scaling the interference samples by a scaling coefficient to obtain a modified extended channel. For example, the modified extended channel may be obtained according to:

$$H_e = [H\sqrt{1-\alpha} Z], \qquad (15)$$

wherein $H_e$ is the modified extended channel; H is the channel; α is the scaling coefficient; and Z is an interference sample matrix that corresponds to the interference samples. In some embodiments, the RRUU may receive a message from the BBU to indicate a requested value of the scaling coefficient. The requested value may be determined, for example, based on a processing load and/or a processing capability of the BBU. In other embodiments, the value of the scaling coefficient may be predetermined.

At 406, the process 400 may further include performing MRC using the modified extended channel to obtain a processed signal. For example, the MRC may be performed according to equation (1) and/or the RRU portion of equation (7).

At 408, the process 400 may further include transmitting the processed signal to a BBU via a fronthaul link.

Figure 5:
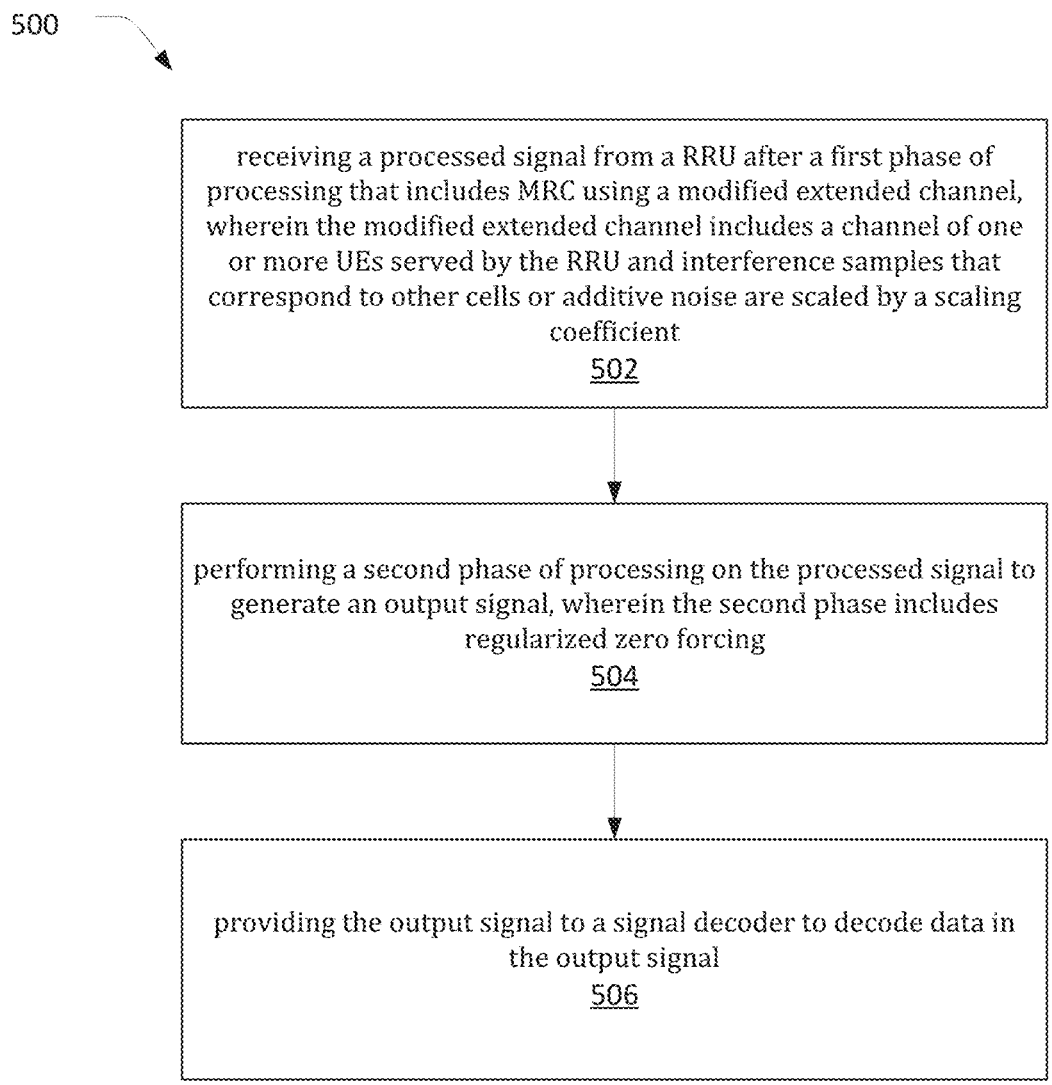
FIG. 5 illustrates a process of a baseband unit (BBU) in accordance with various embodiments.

FIG. 5 illustrates a process 500 of a BBU in accordance with various embodiments. In some embodiments, the process 500 may be performed by baseband circuitry and/or radio frequency (RF) circuitry of the BBU.

At 502, the process 500 may include receiving a processed signal from a RRU after a first phase of processing that includes MRC using a modified extended channel, wherein the modified extended channel includes a channel of one or more UEs served by the RRU and interference samples that correspond to other cells or additive noise are scaled by a scaling coefficient. For example, the first phase may be according to equation (1) and/or the RRU portion of equation (7).

At 504, the process 500 may include performing a second phase of processing on the processed signal to generate an output signal, wherein the second phase includes regularized zero forcing. In some embodiments, the second phase may be performed according to equation (2), the BBU portion of equation (7), and/or equation (14). In some embodiments, the second phase of processing may include a first matrix inversion based on the interference samples and a second matrix inversion based on the channel of the one or more UEs, and wherein the first matrix inversion is performed with a larger granularity in the time or frequency domain than the second matrix inversion At 506, the process may further include providing the output signal to a signal decoder to decode data in the output signal.

In some embodiments, the BBU may send a message to the RRU to indicate a requested value of the scaling coefficient used by the RRU for the first phase of processing. The requested value may be determined, for example, based on a processing load and/or a processing capability of the BBU. In other embodiments, the scaling coefficient may be predetermined.

Systems and Implementations

Figure 6:
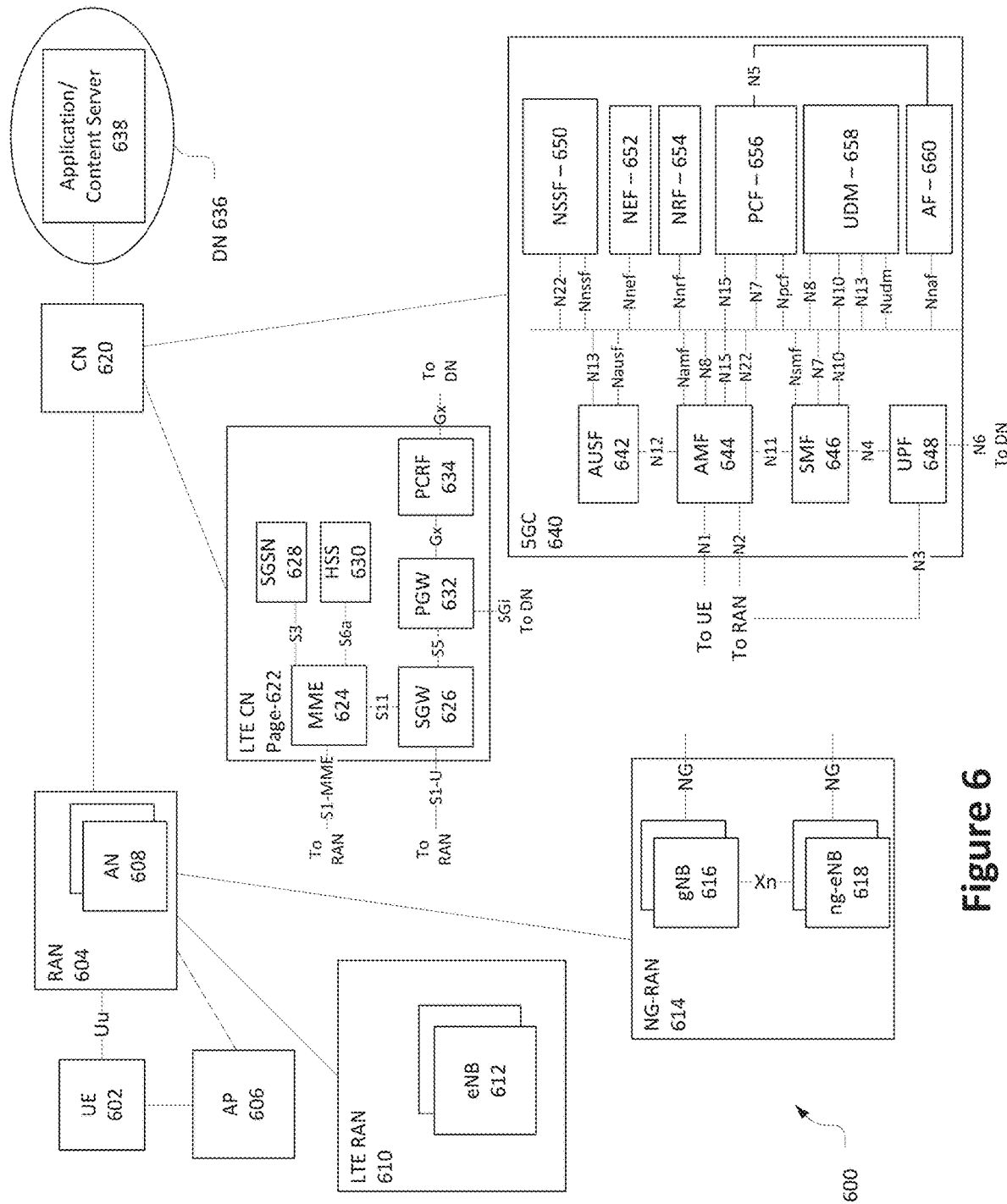
FIG. 6 illustrates a network environment in accordance with various embodiments.
Figure 7:
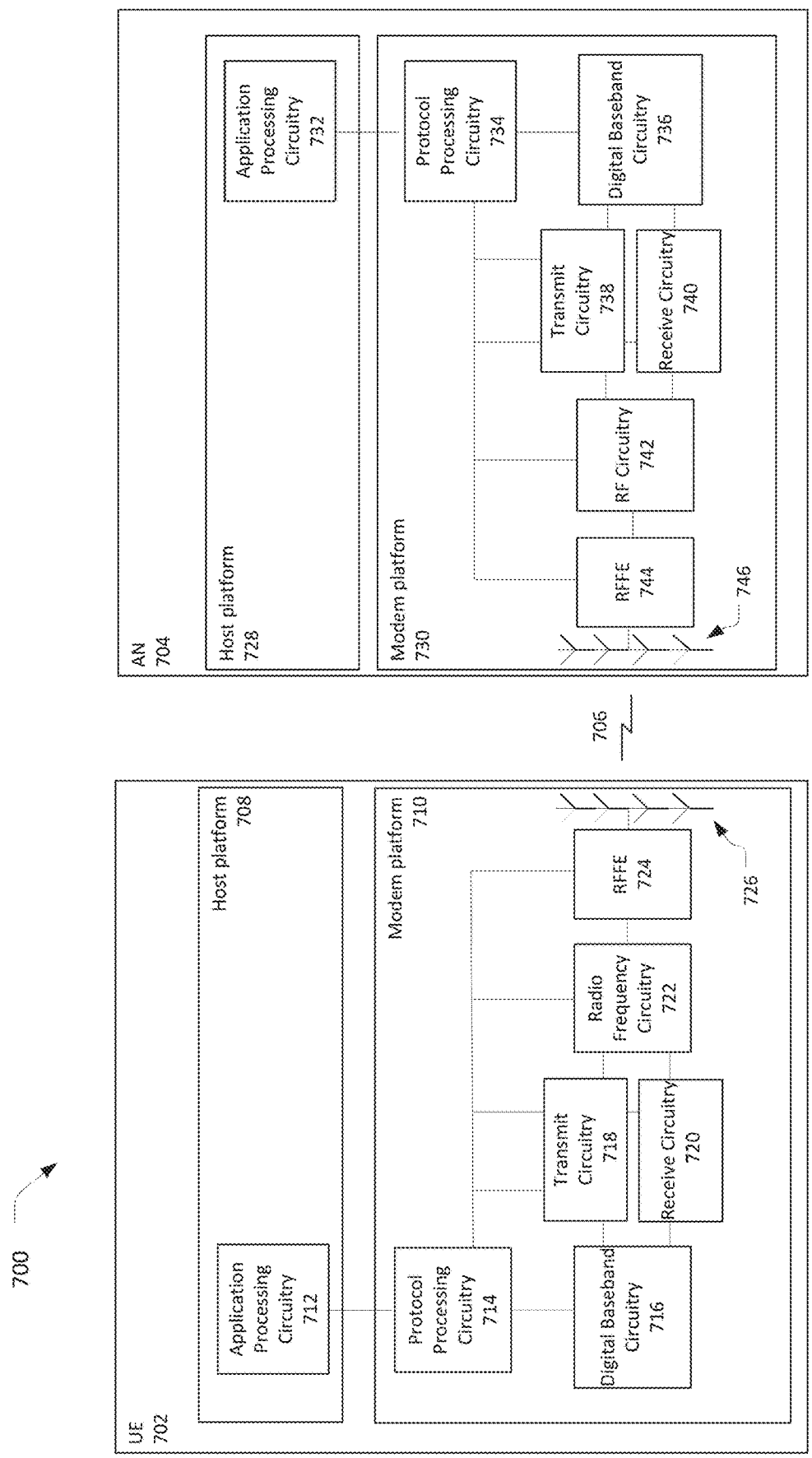
FIG. 7 schematically illustrates a wireless network in accordance with various embodiments.
Figure 8:
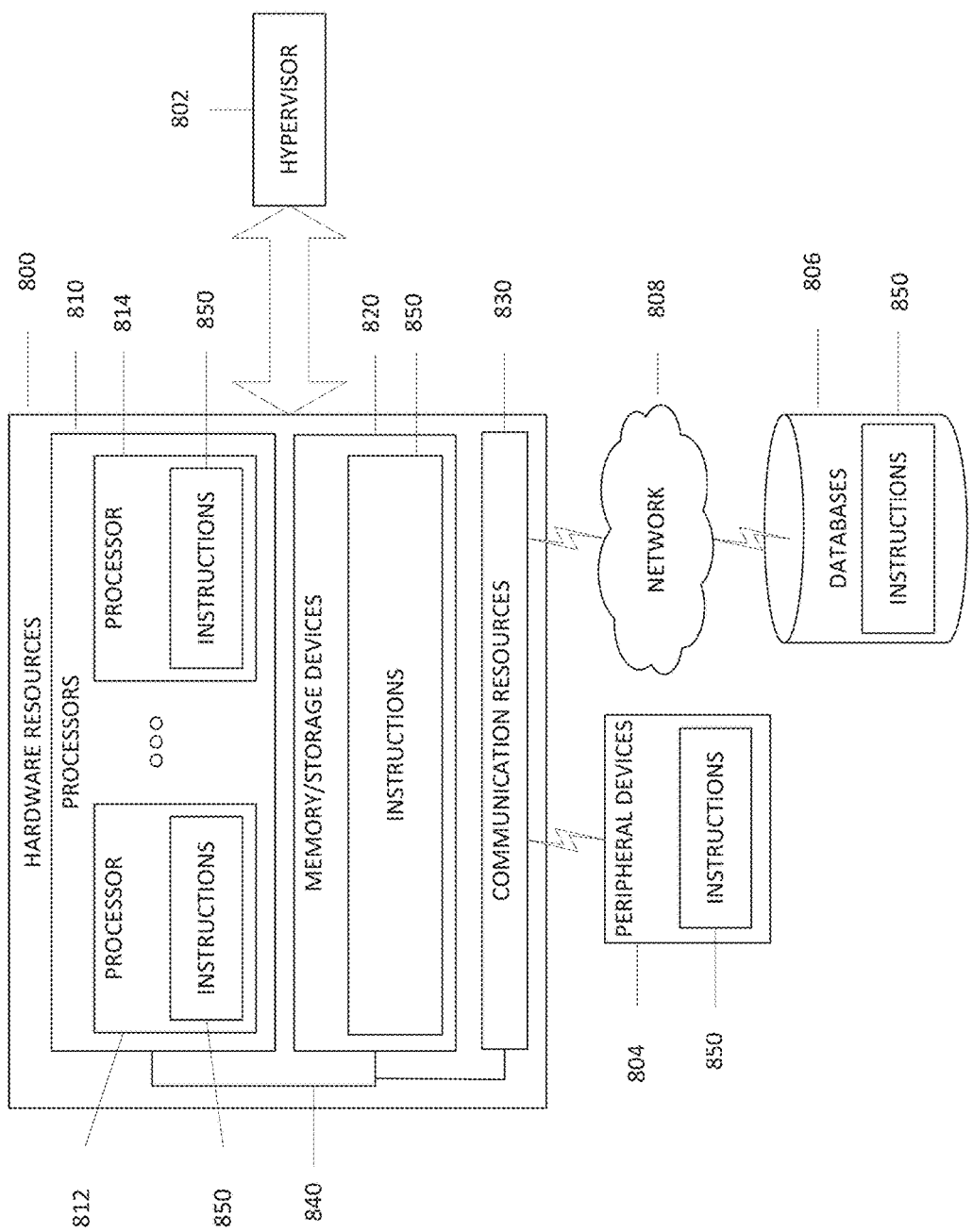
FIG. 8 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 6-8 illustrate various systems, devices, and components that may implement aspects of disclosed embodiments.

FIG. 6 illustrates a network 600 in accordance with various embodiments. The network 600 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 600 may include a UE 602, which may include any mobile or non-mobile computing device designed to communicate with a RAN 604 via an over-the-air connection. In embodiments, the RAN 604 may be a C-RAN as described herein (e.g., corresponding to network environment 100). The UE 602 may be communicatively coupled with the RAN 604 by a Uu interface. The UE 602 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 600 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 602 may additionally communicate with an AP 606 via an over-the-air connection. The AP 606 may manage a WLAN connection, which may serve to offload some/all network traffic from the RAN 604. The connection between the UE 602 and the AP 606 may be consistent with any IEEE 802.11 protocol, wherein the AP 606 could be a wireless fidelity (Wi-Fi®) router. In some embodiments, the UE 602, RAN 604, and AP 606 may utilize cellular-WLAN aggregation (for example, LWA/LWIP). Cellular-WLAN aggregation may involve the UE 602 being configured by the RAN 604 to utilize both cellular radio resources and WLAN resources.

The RAN 604 may include one or more access nodes, for example, AN 608. The AN 608 may correspond to the RRU 102a-d, RRU 202, BBU 104, and/or BBU 204 as described herein. AN 608 may terminate air-interface protocols for the UE 602 by providing access stratum protocols including RRC, PDCP, RLC, MAC, and L1 protocols. In this manner, the AN 608 may enable data/voice connectivity between CN 620 and the UE 602. In some embodiments, the AN 608 may be implemented in a discrete device or as one or more software entities running on server computers as part of, for example, a virtual network, which may be referred to as a CRAN or virtual baseband unit pool. The AN 608 be referred to as a BS, gNB, RAN node, eNB, ng-eNB, NodeB, RSU, TRxP, TRP, etc. The AN 608 may be a macrocell base station or a low power base station for providing femtocells, picocells or other like cells having smaller coverage areas, smaller user capacity, or higher bandwidth compared to macrocells.

In embodiments in which the RAN 604 includes a plurality of ANs, they may be coupled with one another via an X2 interface (if the RAN 604 is an LTE RAN) or an Xn interface (if the RAN 604 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 604 may each manage one or more cells, cell groups, component carriers, etc. to provide the UE 602 with an air interface for network access. The UE 602 may be simultaneously connected with a plurality of cells provided by the same or different ANs of the RAN 604. For example, the UE 602 and RAN 604 may use carrier aggregation to allow the UE 602 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 604 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 602 or AN 608 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 604 may be an LTE RAN 610 with eNBs, for example, eNB 612. The LTE RAN 610 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 604 may be an NG-RAN 614 with gNBs, for example, gNB 616, or ng-eNBs, for example, ng-eNB 618. The gNB 616 may connect with 5G-enabled UEs using a 5G NR interface. The gNB 616 may connect with a 5G core through an NG interface, which may include an N2 interface or an N3 interface. The ng-eNB 618 may also connect with the 5G core through an NG interface, but may connect with a UE via an LTE air interface. The gNB 616 and the ng-eNB 618 may connect with each other over an Xn interface.

In some embodiments, the NG interface may be split into two parts, an NG user plane (NG-U) interface, which carries traffic data between the nodes of the NG-RAN 614 and a UPF 648 (e.g., N3 interface), and an NG control plane (NG-C) interface, which is a signaling interface between the nodes of the NG-RAN 614 and an AMF 644 (e.g., N2 interface).

The NG-RAN 614 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 602 can be configured with multiple BWPs where each BWP configuration has a different SCS. When a BWP change is indicated to the UE 602, the SCS of the transmission is changed as well. Another use case example of BWP is related to power saving. In particular, multiple BWPs can be configured for the UE 602 with different amount of frequency resources (for example, PRBs) to support data transmission under different traffic loading scenarios. A BWP containing a smaller number of PRBs can be used for data transmission with small traffic load while allowing power saving at the UE 602 and in some cases at the gNB 616. A BWP containing a larger number of PRBs can be used for scenarios with higher traffic load.

The RAN 604 is communicatively coupled to CN 620 that includes network elements to provide various functions to support data and telecommunications services to customers/subscribers (for example, users of UE 602). The components of the CN 620 may be implemented in one physical node or separate physical nodes. In some embodiments, NFV may be utilized to virtualize any or all of the functions provided by the network elements of the CN 620 onto physical compute/storage resources in servers, switches, etc. A logical instantiation of the CN 620 may be referred to as a network slice, and a logical instantiation of a portion of the CN 620 may be referred to as a network sub-slice.

In some embodiments, the CN 620 may be an LTE CN 622, which may also be referred to as an EPC. The LTE CN 622 may include MME 624, SGW 626, SGSN 628, HSS 630, PGW 632, and PCRF 634 coupled with one another over interfaces (or "reference points") as shown. Functions of the elements of the LTE CN 622 may be briefly introduced as follows.

The MME 624 may implement mobility management functions to track a current location of the UE 602 to facilitate paging, bearer activation/deactivation, handovers, gateway selection, authentication, etc.

The SGW 626 may terminate an S1 interface toward the RAN and route data packets between the RAN and the LTE CN 622. The SGW 626 may be a local mobility anchor point for inter-RAN node handovers and also may provide an anchor for inter-3GPP mobility. Other responsibilities may include lawful intercept, charging, and some policy enforcement.

The SGSN 628 may track a location of the UE 602 and perform security functions and access control. In addition, the SGSN 628 may perform inter-EPC node signaling for mobility between different RAT networks; PDN and S-GW selection as specified by MME 624; MME selection for handovers; etc. The S3 reference point between the MME 624 and the SGSN 628 may enable user and bearer information exchange for inter-3GPP access network mobility in idle/active states.

The HSS 630 may include a database for network users, including subscription-related information to support the network entities' handling of communication sessions. The HSS 630 can provide support for routing/roaming, authentication, authorization, naming/addressing resolution, location dependencies, etc. An S6a reference point between the HSS 630 and the MME 624 may enable transfer of subscription and authentication data for authenticating/authorizing user access to the LTE CN 620.

The PGW 632 may terminate an SGi interface toward a data network (DN) 636 that may include an application/content server 638. The PGW 632 may route data packets between the LTE CN 622 and the data network 636. The PGW 632 may be coupled with the SGW 626 by an S5 reference point to facilitate user plane tunneling and tunnel management. The PGW 632 may further include a node for policy enforcement and charging data collection (for example, PCEF). Additionally, the SGi reference point between the PGW 632 and the data network 6 36 may be an operator external public, a private PDN, or an intra-operator packet data network, for example, for provision of IMS services. The PGW 632 may be coupled with a PCRF 634 via a Gx reference point.

The PCRF 634 is the policy and charging control element of the LTE CN 622. The PCRF 634 may be communicatively coupled to the app/content server 638 to determine appropriate QoS and charging parameters for service flows. The PCRF 632 may provision associated rules into a PCEF (via Gx reference point) with appropriate TFT and QCI.

In some embodiments, the CN 620 may be a 5GC 640. The 5GC 640 may include an AUSF 642, AMF 644, SMF 646, UPF 648, NSSF 650, NEF 652, NRF 654, PCF 656, UDM 658, and AF 660 coupled with one another over interfaces (or "reference points") as shown. Functions of the elements of the 5GC 640 may be briefly introduced as follows.

The AUSF 642 may store data for authentication of UE 602 and handle authentication-related functionality. The AUSF 642 may facilitate a common authentication framework for various access types. In addition to communicating with other elements of the 5GC 640 over reference points as shown, the AUSF 642 may exhibit an Nausf service-based interface.

The AMF 644 may allow other functions of the 5GC 640 to communicate with the UE 602 and the RAN 604 and to subscribe to notifications about mobility events with respect to the UE 602. The AMF 644 may be responsible for registration management (for example, for registering UE 602), connection management, reachability management, mobility management, lawful interception of AMF-related events, and access authentication and authorization. The AMF 644 may provide transport for SM messages between the UE 602 and the SMF 646, and act as a transparent proxy for routing SM messages. AMF 644 may also provide transport for SMS messages between UE 602 and an SMSF. AMF 644 may interact with the AUSF 642 and the UE 602 to perform various security anchor and context management functions. Furthermore, AMF 644 may be a termination point of a RAN CP interface, which may include or be an N2 reference point between the RAN 604 and the AMF 644; and the AMF 644 may be a termination point of NAS (N1) signaling, and perform NAS ciphering and integrity protection. AMF 644 may also support NAS signaling with the UE 602 over an N3 IWF interface.

The SMF 646 may be responsible for SM (for example, session establishment, tunnel management between UPF 648 and AN 608); UE IP address allocation and management (including optional authorization); selection and control of UP function; configuring traffic steering at UPF 648 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 644 over N2 to AN 608; and determining SSC mode of a session. SM may refer to management of a PDU session, and a PDU session or "session" may refer to a PDU connectivity service that provides or enables the exchange of PDUs between the UE 602 and the data network 636.

The UPF 648 may act as an anchor point for intra-RAT and inter-RAT mobility, an external PDU session point of interconnect to data network 636, and a branching point to support multi-homed PDU session. The UPF 648 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 648 may include an uplink classifier to support routing traffic flows to a data network.

The NSSF 650 may select a set of network slice instances serving the UE 602. The NSSF 650 may also determine allowed NSSAI and the mapping to the subscribed S-NS-SAIs, if needed. The NSSF 650 may also determine the AMF set to be used to serve the UE 602, or a list of candidate AMFs based on a suitable configuration and possibly by querying the NRF 654. The selection of a set of network slice instances for the UE 602 may be triggered by the AMF 644 with which the UE 602 is registered by interacting with the NSSF 650, which may lead to a change of AMF. The NSSF 650 may interact with the AMF 644 via an N22 reference point; and may communicate with another NSSF in a visited network via an N31 reference point (not shown). Additionally, the NSSF 650 may exhibit an Nnssf service-based interface.

The NEF 652 may securely expose services and capabilities provided by 3GPP network functions for third party, internal exposure/re-exposure, AFs (e.g., AF 660), edge computing or fog computing systems, etc. In such embodiments, the NEF 652 may authenticate, authorize, or throttle the AFs. NEF 652 may also translate information exchanged with the AF 660 and information exchanged with internal network functions. For example, the NEF 652 may translate between an AF-Service-Identifier and an internal 5GC information. NEF 652 may also receive information from other NFs based on exposed capabilities of other NFs. This information may be stored at the NEF 652 as structured data, or at a data storage NF using standardized interfaces. The stored information can then be re-exposed by the NEF 652 to other NFs and AFs, or used for other purposes such as analytics. Additionally, the NEF 652 may exhibit an Nnef service-based interface.

The NRF 654 may support service discovery functions, receive NF discovery requests from NF instances, and provide the information of the discovered NF instances to the NF instances. NRF 654 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 654 may exhibit the Nnrf service-based interface.

The PCF 656 may provide policy rules to control plane functions to enforce them, and may also support unified policy framework to govern network behavior. The PCF 656 may also implement a front end to access subscription information relevant for policy decisions in a UDR of the UDM 658. In addition to communicating with functions over reference points as shown, the PCF 656 exhibit an Npcf service-based interface.

The UDM 658 may handle subscription-related information to support the network entities' handling of communication sessions, and may store subscription data of UE 602. For example, subscription data may be communicated via an N8 reference point between the UDM 658 and the AMF 644. The UDM 658 may include two parts, an application front end and a UDR. The UDR may store subscription data and policy data for the UDM 658 and the PCF 656, and/or structured data for exposure and application data (including PFDs for application detection, application request information for multiple UEs 602) for the NEF 652. The Nudr service-based interface may be exhibited by the UDR 221 to allow the UDM 658, PCF 656, and NEF 652 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 658 may exhibit the Nudm service-based interface.

The AF 660 may provide application influence on traffic routing, provide access to NEF, and interact with the policy framework for policy control.

In some embodiments, the 5GC 640 may enable edge computing by selecting operator/3rd party services to be geographically close to a point that the UE 602 is attached to the network. This may reduce latency and load on the network. To provide edge-computing implementations, the 5GC 640 may select a UPF 648 close to the UE 602 and execute traffic steering from the UPF 648 to data network 636 via the N6 interface. This may be based on the UE subscription data, UE location, and information provided by the AF 660. In this way, the AF 660 may influence UPF (re)selection and traffic routing. Based on operator deployment, when AF 660 is considered to be a trusted entity, the network operator may permit AF 660 to interact directly with relevant NFs. Additionally, the AF 660 may exhibit an Naf service-based interface.

The data network 636 may represent various network operator services, Internet access, or third party services that may be provided by one or more servers including, for example, application/content server 638.

FIG. 7 schematically illustrates a wireless network 700 in accordance with various embodiments. The wireless network 700 may include a UE 702 in wireless communication with an AN 704. The UE 702 and AN 704 may be similar to, and substantially interchangeable with, like-named components described elsewhere herein. For example, the AN 704 may correspond to the RRU 102a-d, RRU 202, BBU 104, and/or BBU 204 as described herein. The UE 702 may correspond to the UE 108 described herein.

The UE 702 may be communicatively coupled with the AN 704 via connection 706. The connection 706 is illustrated as an air interface to enable communicative coupling, and can be consistent with cellular communications protocols such as an LTE protocol or a 5G NR protocol operating at mmWave or sub-6 GHz frequencies.

The UE 702 may include a host platform 708 coupled with a modem platform 710. The host platform 708 may include application processing circuitry 712, which may be coupled with protocol processing circuitry 714 of the modem platform 710. The application processing circuitry 712 may run various applications for the UE 702 that source/sink application data. The application processing circuitry 712 may further implement one or more layer operations to transmit/receive application data to/from a data network. These layer operations may include transport (for example UDP) and Internet (for example, IP) operations The protocol processing circuitry 714 may implement one or more of layer operations to facilitate transmission or reception of data over the connection 706. The layer operations implemented by the protocol processing circuitry 714 may include, for example, MAC, RLC, PDCP, RRC and NAS operations.

The modem platform 710 may further include digital baseband circuitry 716 that may implement one or more layer operations that are "below" layer operations performed by the protocol processing circuitry 714 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 710 may further include transmit circuitry 718, receive circuitry 720, RF circuitry 722, and RF front end (RFFE) 724, which may include or connect to one or more antenna panels 726. Briefly, the transmit circuitry 718 may include a digital-to-analog converter, mixer, intermediate frequency (IF) components, etc.; the receive circuitry 720 may include an analog-to-digital converter, mixer, IF components, etc.; the RF circuitry 722 may include a low-noise amplifier, a power amplifier, power tracking components, etc.; RFFE 724 may include filters (for example, surface/bulk acoustic wave filters), switches, antenna tuners, beamforming components (for example, phase-array antenna components), etc. The selection and arrangement of the components of the transmit circuitry 718, receive circuitry 720, RF circuitry 722, RFFE 724, and antenna panels 726 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 714 may include one or more instances of control circuitry (not shown) to provide control functions for the transmit/receive components.

A UE reception may be established by and via the antenna panels 726, RFFE 724, RF circuitry 722, receive circuitry 720, digital baseband circuitry 716, and protocol processing circuitry 714. In some embodiments, the antenna panels 726 may receive a transmission from the AN 704 by receive-beamforming signals received by a plurality of antennas/antenna elements of the one or more antenna panels 726.

A UE transmission may be established by and via the protocol processing circuitry 714, digital baseband circuitry 716, transmit circuitry 718, RF circuitry 722, RFFE 724, and antenna panels 726. In some embodiments, the transmit components of the UE 704 may apply a spatial filter to the data to be transmitted to form a transmit beam emitted by the antenna elements of the antenna panels 726.

Similar to the UE 702, the AN 704 may include a host platform 728 coupled with a modem platform 730. The host platform 728 may include application processing circuitry 732 coupled with protocol processing circuitry 734 of the modem platform 730. The modem platform may further include digital baseband circuitry 736, transmit circuitry 738, receive circuitry 740, RF circuitry 742, RFFE circuitry 744, and antenna panels 746. The components of the AN 704 may be similar to and substantially interchangeable with like-named components of the UE 702. In addition to performing data transmission/reception as described above, the components of the AN 708 may perform various logical functions that include, for example, RNC functions such as radio bearer management, uplink and downlink dynamic radio resource management, and data packet scheduling.

FIG. 8 is a block diagram illustrating components, according to some example embodiments, able to read instructions from a machine-readable or computer-readable medium (e.g., a non-transitory machine-readable storage medium)

and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840 or other interface circuitry. For embodiments where node virtualization (e.g., NFV) is utilized, a hypervisor 802 may be executed to provide an execution environment for one or more network slices/subslices to utilize the hardware resources 800.

The processors 810 may include, for example, a processor 812 and a processor 814. The processors 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface controllers, components, or other suitable devices to communicate with one or more peripheral devices 804 or one or more databases 806 or other network elements via a network 808. For example, the communication resources 830 may include wired communication components (e.g., for coupling via USB, Ethernet, etc.), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting Examples of various embodiments are provided below.

Example 1 includes one or more non-transitory computer-readable media (NTCRM) having instructions stored thereon, that when executed by one or more processors cause a remote radio unit (RRU) to: receive a signal associated with an extended channel that includes a channel of one or more user equipments (UEs) served by the RRU and interference samples that correspond to other cells or additive noise; scale the interference samples by a scaling coefficient to obtain a modified extended channel; perform maximum ratio combining (MRC) of the received signal based on the modified extended channel to obtain a processed signal; and transmit the processed signal to a baseband unit (BBU) via a fronthaul link.

Example 2 includes the one or more NTCRM of Example 1, wherein the processed signal is quantized before transmission to the BBU, and wherein a number of quantization bits in the processed channel is based on a value of the scaling coefficient.

Example 3 includes the one or more NTCRM of Example 1, wherein the MRC is performed using a different granularity for measurements of the channel than for measurements of the interference samples.

Example 4 includes the one or more NTCRM of Example 1, wherein the RRU is to obtain the modified extended channel according to:

$$H_e = [H \sqrt{1-\alpha} Z],$$

wherein $H_e$ is the modified extended channel; H is the channel; $\alpha$ is the scaling coefficient; and Z is an interference sample matrix that corresponds to the interference samples.

Example 5 includes the one or more NTCRM of Example 4, wherein the RRU is to perform the MRC according to:

$$H_e^H = \begin{bmatrix} H^H \\ \sqrt{1-\alpha} Z^H \end{bmatrix}$$

wherein $H_e^H$ denotes a Hermitian Transpose of $H_e$.

Example 6 includes the one or more NTCRM of Example 1, wherein the instructions, when executed, are further to cause the RRU to receive a message from the BBU to indicate a requested value of the scaling coefficient.

Example 7 includes the one or more NTCRM of Example 1, wherein the scaling of the interference samples and MRC based on the extended channel are included in a first phase of processing, and wherein the processed signal is transmitted to the BBU for a second phase of processing that includes regularized zero-forcing to suppress intra-cell or inter-cell interference.

Example 8 includes the one or more NTCRM of Example 7, wherein the first and second phases combine to provide processing based on covariance matrix estimation including a linear combination of a sample covariance matrix and a structured covariance matrix.

Example 9 includes one or more non-transitory computer-readable media (NTCRM) having instructions stored thereon, that when executed by one or more processors cause a baseband unit (BBU) to: receive a processed signal from a remote radio unit (RRU) after a first phase of processing that includes maximum ratio combining (MRC) of a modified extended channel, wherein the modified extended channel includes a received signal on a channel of one or more user equipments (UEs) served by the RRU and interference samples that correspond to other cells or additive noise are scaled by a scaling coefficient; perform a second phase of processing on the processed signal to generate an output signal, wherein the second phase includes regularized zero forcing; and provide the output signal to a signal decoder to decode data in the output signal.

Example 10 includes the one or more NTCRM of Example 9, wherein the second phase of processing includes a first matrix inversion based on the interference samples and a second matrix inversion based on the channel of the one or more UEs, and wherein the first matrix inversion is performed with a larger granularity in the time or frequency domain than the second matrix inversion.

Example 11 includes the one or more NTCRM of Example 9, wherein the regularized zero forcing is performed according to:

$$\left(H_e^H H_e + \alpha \frac{tr(S)}{L} I\right)^{-1}$$

wherein $H_e^H$ is the processed signal, $H_e$ is the channel of the one or more UEs, $\alpha$ is the scaling coefficient, tr is a trace function, S is a sample covariance matrix, L is a number of elements in the received processed signal, and I is an identity matrix.

Example 12 includes the one or more NTCRM of Example 11, wherein the sample covariance matrix, S, is determined according to:

$$S = \frac{1}{L-M} \sum_{k=1}^{L-M} z_k \cdot z_k^H;$$

wherein M is a number of elements in the output signal, and $z_k$ is a vector that corresponds to the interference samples.

Example 13 includes the one or more NTCRM of Example 9, wherein the instructions, when executed, are further to cause the BBU to receive, from the RRU, one or more parameters used by the RRU for the first phase of processing, wherein the second phase of processing is performed based on the one or more parameters.

Example 14 includes the one or more NTCRM of Example 13, wherein the one or more parameters include the scaling coefficient.

Example 15 includes the one or more NTCRM of Example 9, wherein the instructions, when executed, are further to cause the BBU to send a message to the RRU to indicate a requested value of the scaling coefficient.

Example 16 includes the one or more NTCRM of Example 15, wherein the instructions, when executed, are further to cause the BBU to determine the requested value based on one or more of a processing load or a processing capability of the BBU.

Example 17 includes an apparatus to be implemented in a remote radio unit (RRU), the apparatus comprising: radio frequency (RF) interface circuitry; and processor circuitry coupled to the RF interface circuitry. The processor circuitry is to: receive, via the RF interface, a signal associated with an extended channel that includes a channel of one or more user equipments (UEs) served by the RRU and interference samples that correspond to other cells or additive noise; scale the interference samples by a scaling coefficient to obtain a modified extended channel; perform maximum ratio combining (MRC) based on the modified extended channel to obtain a processed signal, wherein the processed signal has fewer elements than the received signal associated with the extended channel; quantize the processed signal to obtain a quantized signal; and transmit the quantized signal to a baseband unit (BBU) via the RF interface circuitry.

Example 18 is the apparatus of Example 17, number of quantization bits in the quantized channel is based on a value of the scaling coefficient.

Example 19 is the apparatus of Example 17, wherein the processor circuitry is to perform the MRC with a different granularity for measurements of the channel than for measurements of the interference samples.

Example 20 is the apparatus of Example 17, wherein the modified extended channel is obtained according to:

$$H_e = [H \sqrt{1-\alpha} Z],$$

wherein $H_e$ is the modified extended channel; H is the channel; $\alpha$ is the scaling coefficient; and Z is an interference sample matrix that corresponds to the interference samples.

Example 21 is the apparatus of Example 20, wherein the MRC is performed according to:

$$H_e^H = \begin{bmatrix} H^H \\ \sqrt{1-\alpha} Z^H \end{bmatrix}$$

wherein $H_e^H$ denotes a Hermitian Transpose of $H_e$.

Example 22 is the apparatus of Example 17, wherein the processor circuitry is further to receive a message from the BBU to indicate a requested value of the scaling coefficient.

Example 23 is the apparatus of Example 17, wherein the processing circuitry is further to send, to the BBU, one or more parameters used by the RRU to determine the quantized signal.

Example 24 is the apparatus of Example 17, wherein the scaling of the interference samples and MRC based on the extended channel are included in a first phase of processing, and wherein the quantized channel is transmitted to the BBU for a second phase of processing that includes regularized zero-forcing to suppress intra-cell or inter-cell interference.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The invention claimed is:

1. One or more non-transitory computer-readable media (NTCRM) having instructions stored thereon, that when executed by one or more processors cause a remote radio unit (RRU) to:
  receive a signal associated with an extended channel that includes a channel of one or more user equipments (UEs) served by the RRU and interference samples that correspond to other cells or additive noise;
  scale the interference samples by a scaling coefficient to obtain a modified extended channel;
  perform maximum ratio combining (MRC) of the received signal based on the modified extended channel to obtain a processed signal, wherein the MRC is performed using a different granularity for measurements of the channel than for measurements of the interference samples; and
  transmit the processed signal to a baseband unit (BBU) via a fronthaul link.

2. The one or more NTCRM of claim 1, wherein the processed signal is quantized before transmission to the BBU, and wherein a number of quantization bits in the processed channel is based on a value of the scaling coefficient.

3. The one or more NTCRM of claim 1, wherein the RRU is to obtain the modified extended channel according to:

$$H_e = [H \sqrt{1-\alpha} Z],$$

wherein $H_e$ is the modified extended channel; H is the channel; $\alpha$ is the scaling coefficient; and Z is an interference sample matrix that corresponds to the interference samples.

4. The one or more NTCRM of claim 3, wherein the RRU is to perform the MRC according to:

$$H_e^H = \begin{bmatrix} H^H \\ \sqrt{1-\alpha} Z^H \end{bmatrix}$$

wherein $H_e^H$ denotes a Hermitian Transpose of $H_e$.

5. The one or more NTCRM of claim 1, wherein the instructions, when executed, are further to cause the RRU to receive a message from the BBU to indicate a requested value of the scaling coefficient.

6. The one or more NTCRM of claim 1, wherein the scaling of the interference samples and MRC based on the extended channel are included in a first phase of processing, and wherein the processed signal is transmitted to the BBU for a second phase of processing that includes regularized zero-forcing to suppress intra-cell or inter-cell interference.

7. The one or more NTCRM of claim 6, wherein the first and second phases combine to provide processing based on covariance matrix estimation including a linear combination of a sample covariance matrix and a structured covariance matrix.

8. One or more non-transitory computer-readable media (NTCRM) having instructions stored thereon, that when executed by one or more processors cause a baseband unit (BBU) to:
receive a processed signal from a remote radio unit (RRU) after a first phase of processing that includes maximum ratio combining (MRC) of a modified extended channel, wherein the modified extended channel includes a received signal on a channel of one or more user equipments (UEs) served by the RRU and interference samples that correspond to other cells or additive noise are scaled by a scaling coefficient;
perform a second phase of processing on the processed signal to generate an output signal, wherein the second phase includes regularized zero forcing, wherein the second phase of processing includes a first matrix inversion based on the interference samples and a second matrix inversion based on the channel of the one or more UEs, and wherein the first matrix inversion is performed with a larger granularity in the time or frequency domain than the second matrix inversion; and
provide the output signal to a signal decoder to decode data in the output signal.

9. The one or more NTCRM of claim 8, wherein the regularized zero forcing is performed according to:

$$\left(H_e^H H_e + \alpha \frac{tr(S)}{L} I\right)^{-1}$$

wherein $H_e^H$ is the processed signal, $H_e$ is the channel of the one or more UEs, $\alpha$ is the scaling coefficient, tr is a trace function, S is a sample covariance matrix, L is a number of elements in the received processed signal, and I is an identity matrix.

10. The one or more NTCRM of claim 9, wherein the sample covariance matrix, S, is determined according to:

$$S = \frac{1}{L-M} \sum_{k=1}^{L-M} z_k \cdot z_k^H;$$

wherein M is a number of elements in the output signal, and $z_k$ is a vector that corresponds to the interference samples.

11. The one or more NTCRM of claim 8, wherein the instructions, when executed, are further to cause the BBU to receive, from the RRU, one or more parameters used by the RRU for the first phase of processing, wherein the second phase of processing is performed based on the one or more parameters.

12. The one or more NTCRM of claim 11, wherein the one or more parameters include the scaling coefficient.

13. The one or more NTCRM of claim 8, wherein the instructions, when executed, are further to cause the BBU to send a message to the RRU to indicate a requested value of the scaling coefficient.

14. The one or more NTCRM of claim 13, wherein the instructions, when executed, are further to cause the BBU to determine the requested value based on one or more of a processing load or a processing capability of the BBU.

15. An apparatus to be implemented in a remote radio unit (RRU), the apparatus comprising:
radio frequency (RF) interface circuitry; and
processor circuitry coupled to the RF interface circuitry, the processor circuitry to:
receive, via the RF interface, a signal associated with an extended channel that includes a channel of one or more user equipments (UEs) served by the RRU and interference samples that correspond to other cells or additive noise;
scale the interference samples by a scaling coefficient to obtain a modified extended channel;
perform maximum ratio combining (MRC) based on the modified extended channel to obtain a processed signal, wherein the processed signal has fewer elements than the received signal associated with the extended channel;
quantize the processed signal to obtain a quantized signal, wherein a number of quantization bits in the quantized channel is based on a value of the scaling coefficient; and
transmit the quantized signal to a baseband unit (BBU) via the RF interface circuitry.

16. The apparatus of claim 15, wherein the processor circuitry is to perform the MRC with a different granularity for measurements of the channel than for measurements of the interference samples.

17. The apparatus of claim 15, wherein the modified extended channel is obtained according to:

$$H_e = [H\sqrt{1-\alpha}Z],$$

wherein $H_e$ is the modified extended channel; H is the channel; $\alpha$ is the scaling coefficient; and Z is an interference sample matrix that corresponds to the interference samples.

18. The apparatus of claim 17, wherein the MRC is performed according to:

$$H_e^H = \begin{bmatrix} H^H \\ \sqrt{1-\alpha} Z^H \end{bmatrix}$$

wherein $H_e^H$ denotes a Hermitian Transpose of $H_e$.

19. The apparatus of claim 15, wherein the processor circuitry is further to receive a message from the BBU to indicate a requested value of the scaling coefficient.

20. The apparatus of claim 15, wherein the processing circuitry is further to send, to the BBU, one or more parameters used by the RRU to determine the quantized signal.

21. The apparatus of claim 15, wherein the scaling of the interference samples and MRC based on the extended channel are included in a first phase of processing, and wherein the quantized channel is transmitted to the BBU for a second phase of processing that includes regularized zero-forcing to suppress intra-cell or inter-cell interference.

22. One or more non-transitory computer-readable media (NTCRM) having instructions stored thereon, that when executed by one or more processors cause a remote radio unit (RRU) to:
   receive a signal associated with an extended channel that includes a channel of one or more user equipments (UEs) served by the RRU and interference samples that correspond to other cells or additive noise;
   scale the interference samples by a scaling coefficient to obtain a modified extended channel;
   perform maximum ratio combining (MRC) of the received signal based on the modified extended channel to obtain a processed signal; and
   transmit the processed signal to a baseband unit (BBU) via a fronthaul link;
   wherein the processed signal is quantized before transmission to the BBU, and wherein a number of quantization bits in the processed channel is based on a value of the scaling coefficient.

23. The one or more NTCRM of claim 22, wherein the instructions, when executed, are further to cause the RRU to receive a message from the BBU to indicate a requested value of the scaling coefficient.

24. The one or more NTCRM of claim 22, wherein the scaling of the interference samples and MRC based on the extended channel are included in a first phase of processing, and wherein the processed signal is transmitted to the BBU for a second phase of processing that includes regularized zero-forcing to suppress intra-cell or inter-cell interference.

25. One or more non-transitory computer-readable media (NTCRM) having instructions stored thereon, that when executed by one or more processors cause a baseband unit (BBU) to:
   receive a processed signal from a remote radio unit (RRU) after a first phase of processing that includes maximum ratio combining (MRC) of a modified extended channel, wherein the modified extended channel includes a received signal on a channel of one or more user equipments (UEs) served by the RRU and interference samples that correspond to other cells or additive noise are scaled by a scaling coefficient;
   receive, from the RRU, an indication of one or more parameters used by the RRU for the first phase of processing, wherein the one or more parameters include the scaling coefficient;
   perform a second phase of processing on the processed signal to generate an output signal, wherein the second phase includes regularized zero forcing, and wherein the second phase is performed based on the one or more parameters; and
   provide the output signal to a signal decoder to decode data in the output signal.

26. The one or more NTCRM of claim 25, wherein the instructions, when executed, are further to cause the BBU to send a message to the RRU to indicate a requested value of the scaling coefficient.

27. The one or more NTCRM of claim 26, wherein the instructions, when executed, are further to cause the BBU to determine the requested value based on one or more of a processing load or a processing capability of the BBU.

28. The one or more NTCRM of claim 25, wherein the regularized zero forcing is performed according to:

$$\left(H_e^H H_e + \alpha \frac{tr(S)}{L} I\right)^{-1}$$

wherein $H_e^H$ is the processed signal, $H_e$ is the channel of the one or more UEs, $\alpha$ is the scaling coefficient, tr is a trace function, S is a sample covariance matrix, L is a number of elements in the received processed signal, and I is an identity matrix.

* * * * *